United States Patent

[11] 3,627,848

| [72] | Inventor | Jay Lyman Bishop<br>Summit, N.J. |
|------|----------|--------------------------------|
| [21] | Appl. No. | 809,374 |
| [22] | Filed | Mar. 21, 1969 |
| [45] | Patented | Dec. 14, 1971 |
| [73] | Assignee | CIBA Corporation<br>Summit, N.J.<br>Continuation-in-part of application Ser. No. 761,805, Sept. 23, 1968, Continuation-in-part of application Ser. No. 761,822, Sept. 23, 1968. This application Mar. 21, 1969, Ser. No. 809,374 |

[54] 1-BROMO-3,4-DICHLOROBUTANE
1 Claim, No Drawings

| [52] | U.S. Cl. | 260/652,<br>260/648 R, 260/658 R, 424/352 |
|------|----------|------|
| [51] | Int. Cl. | C07c 19/02 |
| [50] | Field of Search | 260/648 R,<br>652 R, 663, 658 R |

[56] References Cited
UNITED STATES PATENTS

| 3,005,845 | 10/1961 | Bain | 260/652 R |
| 2,058,466 | 10/1936 | Kharasch | 260/658 R |
| 3,108,141 | 10/1963 | Gasson et al. | 260/658 R |

OTHER REFERENCES

Fridlina et al., Chem. Abstracts 55, 19755c (1961)
Mamedov et al., Chem. Abstracts 58, 4410e (1963)
Sennewald et al., Chem. Abstracts 69, 66897d (1968)

*Primary Examiner*—Daniel D. Horwitz
*Attorneys*—Harry Goldsmith, Joseph G. Kolodny, Bryant W. Brennan and Edward J. Sites

ABSTRACT: Cyclopropylmethyl chloride or its homologs, which are valuable intermediates or drugs, are prepared by addition of hydrogen bromide to dichloro-n-butenes or their homologs and reaction of the resulting 1-bromo-3,4-dichlorobutanes with metals.

1-BROMO-3,4-DICHLOROBUTANE

CROSS-REFERENCES TO RELATED APPLICATIONS

This is a continuation-in-part of applications Ser. No. 761,805 and Ser. No. 761,822, both filed Sept. 23, 1968.

BACKGROUND OF THE INVENTION

Cyclopropylmethyl chloride, an intermediate in the preparation of a number of valuable products, e.g. pharmacologically active substances, has been prepared according to conventional methods from already cyclic starting materials, e.g. by chlorination of methylcyclopropane or esterification of cyclopropyl-methanol with hydrochloric acid, according to Walling and Fredricks et al., J. Am. Chem. Soc. 84,3326 (1962) or Roberts and Mazur, ibid. 73, 2509 (1951).

Surprisingly it was found that also trihalogenated alkanes, e.g. the 1-bromo-3,4-dichlorobutane, can be cyclized with a metal, leaving the third halogen atom intact, i.e. not forming a considerable amount of the corresponding metal-organic compound.

Of the bromo-dichloro-n-butanes containing no carbon atom with more than one halogen atom attached thereon, only the 1-bromo-2,3-dichloro-butane has been described. It has been obtained by Freidlina et al., Doklady Akad. Nauk S.S.S.R. 137, 341 (1961), by rearrangement in the hydrobromination of 3,3-dichlorobutene-1, and by Charon, Annales de Chemie et de Physik [2], 17, 238 (1899) by chlorination of 1-bromobutene-2.

SUMMARY OF THE INVENTION

The present invention concerns and has for its object the provision of a new process for the preparation of cyclopropylmethyl chloride or its homologs, which comprises reacting 3,4-dichloro-butene-1 or its homologs with hydrogen bromide in the presence of a free radical generator and reacting the resulting 1-bromo-3,4-dichlorobutane or its homologs with metals. The resulting products are useful as intermediates, preferably in the synthesis of drugs, or as nematocides.

DESCRIPTION OF THE PREFERRED EMBODIMENTS

The preferred process of the invention can be depicted as follows:

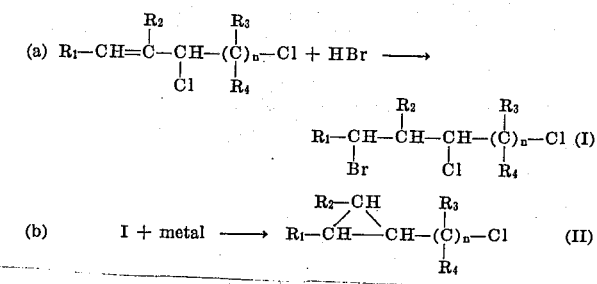

wherein each of $R_1$ to $R_4$ is preferably hydrogen, but also lower alkyl, especially methyl, furthermore ethyl, n- or i-propyl or -butyl, and n is preferably the integer 1, but also 2 to about 7.

A free radical generator used in step (a) is, for example, a heavy metal, preferably a paramagnetic metal, e.g. finely divided iron, nickel or cobalt, but also copper or vanadium. Advantageously oxygen or inorganic or organic peroxides are used in the process of the invention, e.g. persulfuric acid, hydrogen peroxide or ascaridol, preferably aliphatic or aromatic percarboxylic acids, e.g. peracetic, perlauric, perbenzoic or monoperphthalic acid, or especially their anhydrides. They are present in the usual amounts, e.g. 0.1–1 molar percent.

The hydrobromination is carried out according to otherwise standard methods, advantageously while exposed to visible or ultraviolet light, in the presence or absence of diluents, preferably such as are inert to the reagents and are solvents thereof, such as unsubstituted or halogenated hydrocarbons and/or aliphatic or aromatic ethers, e.g. low or medium boiling petroleum fractions, such as petroleum ether or n-hexane, preferably cycloalkanes, e.g. cyclohexane, hexahydrotoluene or -xylene, or decahydronaphthalene; benzene, biphenyl, toluene or xylene and/or methylene chloride, carbon tetrachloride, 1,2-dichloroethane, chlorohexanes, chlorobenzenes or -naphthalenes and/or diethyl ether, anisole or diphenyl ether.

The metals used in step (b) are preferably polyvalent, non-precious metals, their alloys or mixtures, e.g. magnesium, aluminum, nickel or especially zinc alone or in conjunction with other metals, preferably copper, cadmium or mercury. The cyclization is advantageously carried out in a medium which solubilizes the metal-organic intermediate and/or the liberated salts. It preferably is a nonaqueous medium, such as an open or cyclic lower alkanoic acid nitrile, amide or ester, e.g. acetonitrile, dimethylformamide or -acetamide, urea, butyrolactam or acetanilide, ethyl acetate or butyrolactone, alcohols, such as alkanols, e.g. methanol, ethanol, propanol or n-decanol, mono- or diethers, e.g. diethyl ether, tetrahydrofuran, 1,4-dioxane or anisole, dialkylsulfoxides, e.g. dimethylsulfoxide, and/or mono- or diamines, e.g. ethylenediamine, aniline, toluidine or morpholine, or hydroxyalkylamines, e.g. ethanolamine or di-(2-hydroxyethyl)-amine.

The process of the invention is carried out according to otherwise standard conditions, e.g. in the presence or absence of other diluents, preferably such as are inert to the reagents and are solvents thereof, such as hydrocarbons, e.g. n-heptane, cyclohexane or toluene, of catalysts and/or inert atmospheres, at low or high temperatures, step (a) preferably at room temperature or slightly elevated temperatures ans step (b) preferably between about 25° and about 120°, at atmospheric, superatmospheric or reduced pressure. In step (b) chelating agents and/or inorganic or organic bases may be used, such as ammonium or sodium carbonate, bicarbonate, oxalate or tartrate, aliphatic, aromatic or heterocyclic mono- or polyamines, e.g. ammonia, ethylenediamine, tetramethyl ethylenediamine or pyridine, in order to incapacitate the Lewis acids formed and control pH.

The invention also comprises any modification of the above process, wherein a compound resulting as an intermediate at any stage thereof is used as starting material and the remaining steps are carried out or the process is discontinued at any stage thereof, or in which the starting material is formed under the reaction conditions. Those reagents are preferably used which lead to the products indicated above as the preferred embodiments of the invention.

The starting material is known or, if new, may be prepared according to the methods used for the known products.

The products of the invention can either be used as such or as intermediates in the preparation of valuable products, for example those described in U.S. Pat. Nos. 3,192,200 and 3,385,857 There, cyclopropylmethyl bromide and its homologs are used as intermediates. In the analogous manner, an equivalent amount of cyclopropylmethyl chloride or its homologs can be used for the same purpose. Said cyclic compounds of the invention can also be used against intestinal nematodes, e.g. hookworms or ascarids in mammals, preferably domestic animals, such as dogs or sheep, in a single oral dose of about 0.5 to 25 ml. preferably at about 5 to 15 ml. per day. They can be directly applied, or in the form of veterinary compositions containing them in conjunction or admixture with inorganic or organic, solid or liquid pharmaceutical excipients, suitable for enteral, e.g. oral, administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols, and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said compositions are prepared by conventional methods and contain about 10 to 95 percent, more particularly 25 to 75 percent, of the active ingredients. The compounds of the invention may also be encapsulated in a single capsule, e.g. a standard gelatin capsule, or in multiple microcapsules or coacervates.

The new intermediates resulting from reaction (a), i.e. 1,4-dichloro-2-bromo-butane, 1,2-dichloro-3-bromo-butane, the 1-bromo-3,4-dichlorobutanes and their homologs, can be used as biocides, preferably pesticides, e.g. bactericides, fungicides, insecticides, acaricides or vermicides alone or in the form of pesticidal compositions, containing them in conjunction or admixture with inorganic or organic, solid or liquid additives, e.g. excipients, solvents, diluents, dispersants, wetting agents, adhesives, fertilizers and/or other pesticides. Spray solutions may be prepared with the use of medium or high boiling petroleum fractions, e.g. kerosene, other hydrocarbons, e.g. xylenes or tetrahydronaphthalenes, coal tar oil or vegetable oils and/or other halogenated hydrocarbons, e.g. tri- or tetrachloroethane, -ethene or -benzenes, having advantageously boiling points above 100°. Advantageous are aqueous emulsions, concentrates, pastes or wettable spray powders. Suitable emulsifiers or dispersants therein are either nonionic or ionic products, e.g. condensation products of ethylene oxide with higher aliphatic alcohols, mercaptans, acids or amines, such as the condensation product of 1 mol. ethylene oxide with about 0.04 mol. octadecanol, about 0.06 mol. decylamine or about 0.08 mol. dodecylmercaptan, or sodium dodecylsulfate or dodecylbenzenesulfonate, potassium or triethanol ammonium oleate or abietate, N-cetylpyridinium bromide or N,N-bis-hydroxyethyl-N-benzyl-N-dodecylammonium chloride. Dusting or casting preparations may contain the active ingredients in conjunction with talc, kaolin, bentonite, calcium carbonate or phosphate, coal, cork and/or wood powder. Solid preparations may also be granulated or may contain conventional additives that improve the distribution, penetration, adhesion and stability against rain and wind, such as fatty acids, resins, glues, casein and/or alginates.

The following examples are intended to illustrate the invention and are not to be construed as being limitations thereon. Temperatures are given in degrees Centigrade and all parts or percentages wherever given are such by weight.

EXAMPLE 1

To 874 g. 3,4-dichloro-butene-1, 2.5 g. benzoyl peroxide are added while stirring and hydrogen bromide is bubbled through at the rate of about 1 g./min. and the temperature is maintained between about 35° and 40° by fine adjustment of the hydrogen bromide flow rate. After 5-½ hours another 1.5 g. benzoyl peroxide is added and stirring is continued to a total of about 7 hours, during which time 140 percent of the theoretical amount of hydrogen bromide is taken up. The mixture is washed twice with 250 ml. portions of cold 2N aqueous sodium hydroxide, 500 ml. portion of water and 250 ml. brine. It is dried over 30 g. anhydrous magnesium sulfate, which latter is leached with 75 ml. methylene chloride. To the combined nonaqueous solutions 215 g. of the eutectic mixture of biphenyl and diphenyl ether are added, the whole is distilled through a 1 meter by 20 mm. column packed with 6 mm. glass helices and the low boiling material removed at atmospheric pressure up to about 70°. Hereupon the pressure is reduced to 20 mm. Hg. and the fraction boiling at 95° collected; it represents the 1-bromo-3,4-dichloro-butane of a purity grade substantially greater than 90 percent (by proton magnetic resonance, mass spectroscopic and gas-liquid chromatographic data).

The mixture of 50 ml. 3 percent hydrochloric acid and 37.5 g. zinc powder is stirred until the evolution of hydrogen ceases. Hereupon the solution of 8.2 g. copper II sulfate pentahydrate in 500 ml. water is added and stirring is continued until the blue color disappears. The mixture is decanted, the residue washed twice with 50 ml. portions of water, then twice with 50 ml. portions of dimethylformamide. The zinc-copper obtained is suspended in 350 ml. dimethylformamide and 25 ml. of the solution of 30.1 g. 1,2-diaminoethane in 150 ml. dimethylformamide is added. The rest of the 1,2-diaminoethane solution is added dropwise during 2 hours to the heated mixture obtained (about 60°); simultaneously 103 g. of about 90 percent 1-bromo-3,4-dichloro-butane is added dropwise during 1 hour (from a separate vessel entry, since the solutions are incompatible). Heating and stirring is continued until all the zinc is consumed (or to a maximum of 24 hours if it stays so long. The presence of zinc besides the remaining copper is detected by the evolution of hydrogen from a sample of the suspended solids in hydrochloric acid). The mixture is distilled at 60° and 20 mm. Hg. until about 200 ml. distillate is collected. This is redistilled through a 1 m. by 20 mm. column packed with 6 mm., glass helices and the fraction boiling at 82°–90° mm. Hg. collected; it represents about 90 percent pure cyclopropylmethyl chloride.

EXAMPLE 2

Through the stirred mixture of 116 g. 93 percent 3,4-dichlorobutene-1 (containing 6 percent 1,4-dichloro-butene-2) and 0.34 ml. 30 percent aqueous hydrogen peroxide, hydrogen bromide is passed at a rate of about 1.75 g./min., while keeping the temperature at or below 40° and adding 1.3 ml. of said hydrogen peroxide in 0.3–0.5 ml. portions at 30 minute intervals. About one hour after the last peroxide addition, the hydrogen bromide uptake drops to about 1 g./30 min. and stirring is continued for 1–½ hours at 25°. Hereupon 100 ml. 2N aqueous sodium hydroxide are added, stirring is continued for 5 minutes and the organic layer separated. It is washed 3 times with 50 ml. water, once with 50 ml. brine, dried over 40 g. anhydrous magnesium sulfate, distilled through a 1 m. by 25 mm. column packed with 6 mm. glass helices, and the fraction boiling at 90°–95°/20 mm. Hg. collected; it represents 85 percent pure 1-bromo-3,4-dichloro-butane, besides mostly 1,2-dichloro-3-bromobutane and 1,4-dichloro-2-dichloro-2-bromo-butane.

The foreruns of several batches are combined and redistilled through the same column, yielding at 30°–60°/20 mm. mainly starting material, at 61°14 65°/20 mm. 85 percent pure 1,4-dichloro-butene-2, at 65°–80°/20 mm. a mixture containing 71 percent 1,2-dichloro-3-bromo-n-butane, 25 percent 1,4-dichloro-butene-2 and 4 percent 1-bromo-3,4-dichlorobutane, at 80°–85° a mixture containing 85 percent 1,2-dichloro-3-bromo-n-butane and 15 percent 1-bromo-3,4-dichloro-butane.

To the stirred suspension of 37.9 g. zinc powder in 100 ml. tetrahydrofuran, the solution of 0.74 g. hydrogen chloride in 50 ml. tetrahydrofuran is added and the mixture stirred for 5 minutes. Hereupon the suspension of 3.44 g. anhydrous cuprous chloride in 100 ml. tetrahydrofuran is added, the mixture stirred for ½ hour and combined with 400 ml. dimethylformamide. It is concentrated, the temperature gradually raised to 100° and maintained there throughout the following distillation. The pressure is reduced to about 150 mm. Hg. until the dimethylformamide begins to come over and the first 10 ml. thereof are discarded, together with the previously collected tetrahydrofuran. To the concentrate, the solution of 103 g. 85 percent 1-bromo-3,4-dichloro-butane in 450 ml. dimethylformamide is added during ½ hour and distillate is collected at a rate of about 15 ml./min. and the receiver is kept at −10°. Distillation is continued at the same rate for additional 20 minutes, during which time 300 ml. dimethylformamide are added to the reaction mixture, to yield about 900 ml. distillate containing about 5 percent cyclopropylmethyl chloride. It can be rectified as shown in example 1.

The 85 percent 1-bromo-3,4-dichloro-butane can be redistilled through the above 1 m. by 25 mm. column and the first 3 percent of the fraction boiling at 90°–94°/20 mm.Hg. consists mainly of 1,4-dichloro-2bromo-butane. Its structure was proven by hydrobromination of 1,4-dichloro-butene-2 and comparison of the nuclear magnetic resonance and mass spectrum data.

EXAMPLE 3

To the stirred suspension of 36.2 g. zinc-copper (described in example 1) in 500 ml. dimethylsulfoxide and 50 ml. n-heptane, 103 g. 95 percent 1-bromo-3,4-dichloro-butane are quickly added at 60° and 180 mm.Hg. The temperature is quickly raised to 70° and the pressure so adjusted that 1.5 ml. n-heptane/minute distills over. Distillation is continued for 4 hours, during which time n-heptane is introduced below the liquid surface at the distillation rate. During the first hour also 30.1 g. 1,2-diaminoethane are added dropwise, to yield 373.4 g. distillate containing 7.22 percent cyclopropylmethyl chloride. It is rectified through a 1 m. by 15 mm. column, packed with 6 mm. glass helices, and the fraction boiling at 82°–90/760 mm. Hg. collected, which is about 90 percent pure cyclopropylmethyl chloride.

EXAMPLE 4

To the vigorously stirred suspension of 37.9 g. zinc powder (96 to 100 percent pure) in 500 ml. dimethylformamide is added 3.44 g. anhydrous cuprous chloride. The mixture is heated to 60°, stirred ½ hour and heated further to 100°, and pressure is reduced until 10 ml. dimethylformamide distillate is collected (about 150 mm. Hg. pressure). Distillate is then collected separately at 10 ml. per minute as a solution of 103 g. 1-bromo-3,4-dichloro-butane in 500 ml. dimethylformamide is added to the reaction mixture over a 1 hour period. Distillate is collected for 20 minutes longer. The distillate obtained contains about 4 percent cyclopropylmethyl chloride; it is rectified as in example 1. The 1-bromo-3,4-dichloro-butane used in this method can be crude undistilled hydrobromination product of about 85 percent purity or higher, after an aqueous sodium bicarbonate wash.

I claim:
1. The 1-bromo-3,4-dichlorobutane.

* * * * *